(12) United States Patent
Beckner et al.

(10) Patent No.: US 8,425,361 B1
(45) Date of Patent: Apr. 23, 2013

(54) LUBRICATION SYSTEM FOR A PLANETARY GEAR SET

(75) Inventors: Kevin C. Beckner, Indianapolis, IN (US); Gregory W. Kempf, Avon, IN (US); Timothy J. Reinhart, McCordsville, IN (US); Joel E. Mowatt, Zionsville, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/353,070

(22) Filed: Jan. 18, 2012

(51) Int. Cl.
*F16H 57/04* (2010.01)

(52) U.S. Cl.
USPC ............................................ 475/159

(58) Field of Classification Search .................. 475/159, 475/346, 347
See application file for complete search history.

(56) References Cited

U.S. PATENT DOCUMENTS

| 2005/0209037 A1* | 9/2005 | Kempf | 475/149 |
| 2010/0144479 A1* | 6/2010 | Nakamura et al. | 475/159 |
| 2011/0092330 A1* | 4/2011 | Nishida et al. | 475/159 |

\* cited by examiner

*Primary Examiner* — Edwin A Young

(57) ABSTRACT

An assembly in a transmission of a motor vehicle for communicating lubrication oil to a bearing in a planetary gear set includes a planet carrier having a plate with an inner groove in communication with a slot of a bushing, a pinion hole, and a second passage that communicates between the inner groove and the pinion hole. The planet carrier further includes a pinion disposed within the pinion hole and a bearing disposed on the pinion for supporting a planetary gear. A groove is disposed in the pinion and is in communication with the second passage. A third passage extends from the groove into the pinion. A fourth passage extends from the third passage into the pinion along an axis of the pinion. A fifth passage extends from the fourth passage to the outer surface. Pressurized lubrication oil is communicated through the plate and pinion to the bearing.

20 Claims, 2 Drawing Sheets

LUBRICATION SYSTEM FOR A PLANETARY GEAR SET

TECHNICAL FIELD

The present disclosure relates to a lubrication system for a planetary gear set, and more particularly to a pinion bearing lubrication system for a planetary gear set.

BACKGROUND

The statements in this section merely provide background information related to the present disclosure and may or may not constitute prior art.

Automatic transmissions in vehicles often contain planetary gear sets to transmit one or more forward and reverse gear speed ratios between an engine and at least one drive axle. These planetary gear sets experience significant stress at high levels of RPM operation of the automatic transmission. Therefore, it is desirable to have adequate levels of lubrication provided to the bearing elements of the planetary gear sets. Typically this is accomplished by using a pressurized lubrication system that provides pressurized lubrication oil to the bearing elements. While effective, these pressurized systems can be subject to leakage and can be difficult to assemble due to orientation requirements in order to maintain a pressurized oil circuit to feed the bearings. An alternate method of providing adequate lubrication to the bearing elements is a non-pressurized lubrication system. While effective, to provide adequate lubrication these systems require that the transmission pump provide a greater volume of oil relative to pressurized systems. Therefore, the transmission pump in a non-pressurized system must have an increase in performance or require a larger pump. However, increases in pump performance requirements may reduce the durability of existing pumps. Larger pumps may present packaging issues and may reduce fuel efficiency. Accordingly, there is a need for a pressurized lubrication system for a planetary gear set that minimizes leakage, provides lubrication to the bearing elements in any condition, and does not compromise the ease of assembly of the planetary gear set.

SUMMARY

In an aspect of the present invention, an assembly in a transmission of a motor vehicle is provided for communicating lubrication oil to a planetary gear set. The assembly includes a shaft having a first passage, a bushing disposed around the shaft and having a slot in communication with the first passage, and a planet carrier having a plate with an inner groove in communication with the slot of the bushing, a pinion pin hole, and a second passage that communicates between the inner groove and the pinion pin hole. The planet carrier further includes a pinion pin disposed within the pinion pin hole and a bearing disposed on the pinion pin for supporting a planetary gear. The pinion pin includes a cylindrical body having a first end, a second end opposite the first end, and an outer surface, wherein the outer surface supports the bearing. A groove is disposed in the outer surface proximate the first end and extends circumferentially around the cylindrical body and is in communication with the second passage. A third passage extends from the groove into the cylindrical body. A fourth passage extends from the third passage into the cylindrical body along an axis of the cylindrical body. A fifth passage extends from the fourth passage to the outer surface.

A pressurized hydraulic fluid is communicated from the first passage, through the slot of the bushing into the inner groove of the planet carrier, through the second passage into the groove of the pinion pin, through the third and fourth passages to the fifth passage, and from the fifth passage to the bearing supported on the outer surface of the pinion pin.

In one embodiment a second bearing is supported on the pinion pin.

In another embodiment the fifth passage defines an outlet on the outer surface disposed axially between the bearings.

In yet another embodiment the first end of the pinion pin is disposed in the pinion pin hole of the plate.

In yet another embodiment the planet carrier further includes a spider connected to the plate, the spider having a second pinion pin hole opposite the pinion pin hole of the plate, and wherein the second end of the pinion pin is supported within the second pinion pin hole.

In yet another embodiment the fifth passage extends along a diameter of the cylindrical body and through the axis.

In yet another embodiment the fifth passage defines a first port on the outer surface and a second port on the outer surface opposite the first port.

In yet another embodiment the fifth passage is disposed at the axial midpoint of the cylindrical body.

In yet another embodiment the third passage defines a port in the groove of the outer surface.

Further areas of applicability will become apparent from the description provided herein. It should be understood that the description and specific examples are intended for purposes of illustration only and are not intended to limit the scope of the present disclosure.

DESCRIPTION

Figure 1:
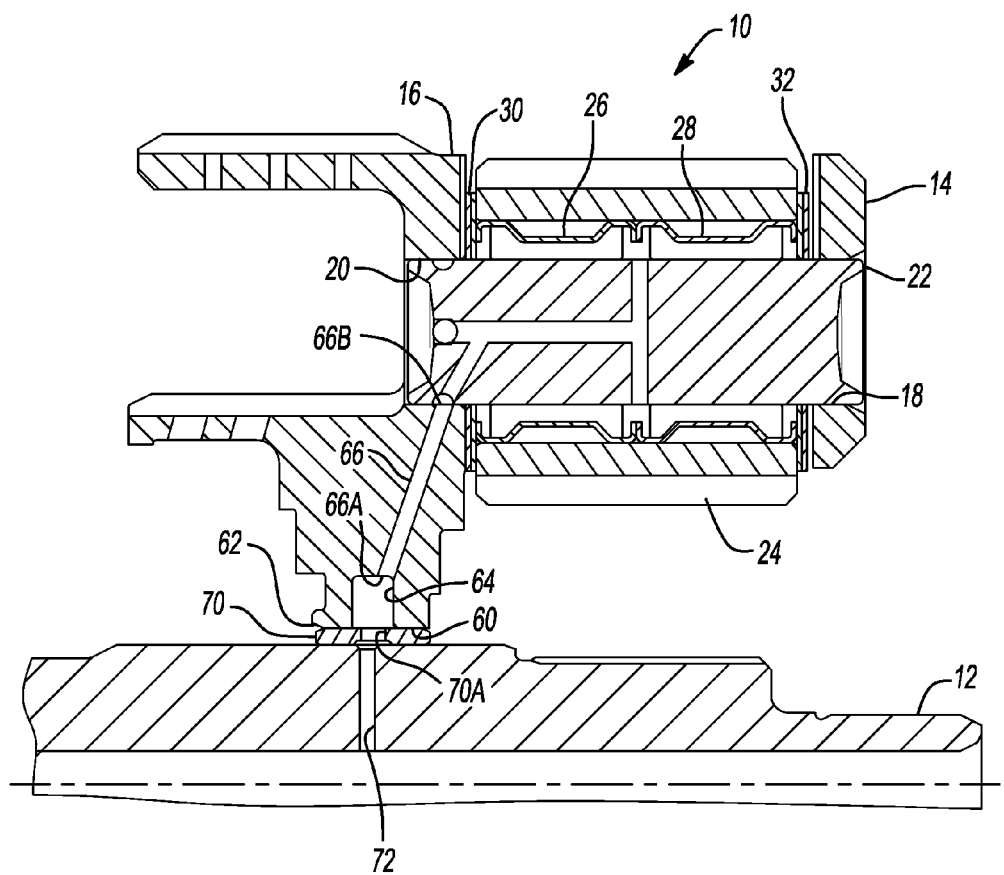
FIG. 1 is a side cross-sectional view of a lubrication system in a portion of an exemplary planetary gear set in accordance with an embodiment of the present invention.

Referring to the drawings, wherein like reference numbers refer to like components, in FIG. 1 a side view of a planet carrier assembly 10 is illustrated in an exemplary environment, in accordance with an embodiment of the disclosure. In the example provided, the planet carrier assembly 10 is disposed with a shaft 12 in an automatic transmission of an automobile. The planet carrier assembly 10, however, may be disposed around other rotary components in other environments without departing from the scope of the present invention. These components may include, for example, countershafts, layshafts, sleeve shafts, clutches, brakes, turbine shafts, a transmission housing, or other planetary gear sets, to name but a few. The planetary carrier assembly 10 is preferably part of a planetary gear set that also includes one or more sun gears (not shown) and one or more ring gears (not shown).

The planetary gear assembly 10 includes a spider carrier 14 welded or otherwise connected with a carrier flange, black plate, or shell 16. The spider carrier 14 and the carrier flange 16 each include a plurality of axially aligned pinion pin holes 18 and 20, respectively. Each set of axially aligned pinion pin holes 18 and 20 support for rotation a pinion pin 22. Each planet pinion pin 22 in turn supports one of a plurality of planet gears 24 for rotation thereon. It should be appreciated that any number of planet gears 24 may be employed with the carrier assembly 10.

Disposed between the planet pinion pin 22 and the planet gear 24 are a first bearing 26 and a second bearing 28. The first and second bearings 26 and 28 support the planet gear 24 for rotation on the planet pinion pin 22. The bearings 26 and 28 are disposed axially adjacent each other relative to the planet pinion pin 22. A pair of washers 30 and 32 is also disposed on the planet pinion pin 22. The washer 30 is disposed axially between the first bearing 26 and the carrier flange 16 and the washer 32 is disposed axially between the second bearing 28 and the carrier spider 14.

Figure 2:
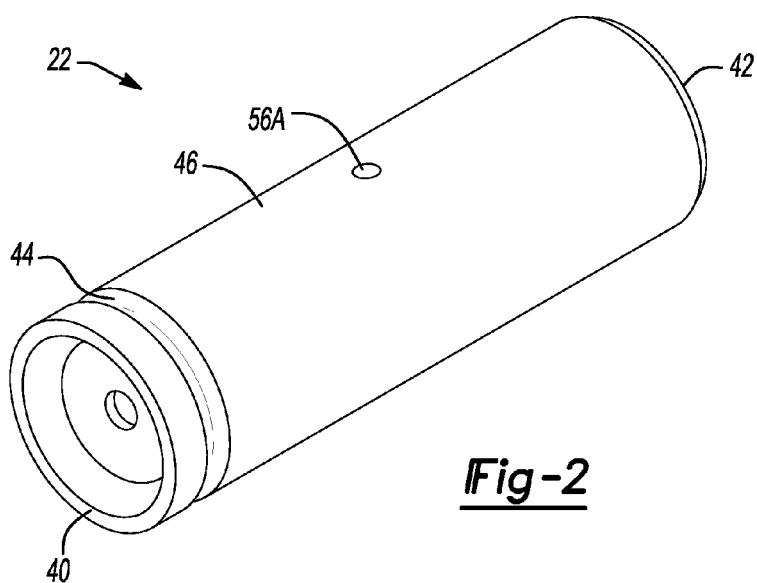
FIG. 2 is a front perspective view of a pinion pin used in the lubrication system in accordance with an embodiment of the present invention.
Figure 3:
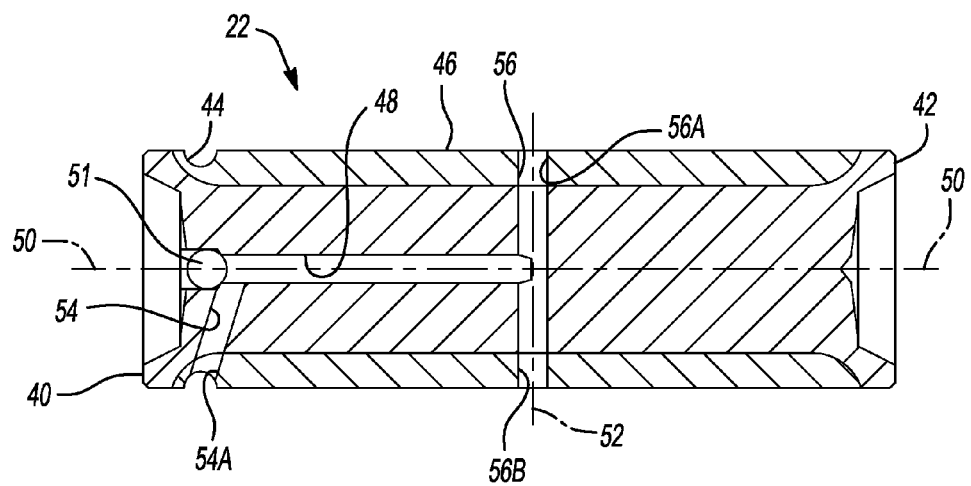
FIG. 3 is a side cross-sectional view of the pinion pin shown in FIG. 2 viewed in the direction of arrow 3-3.

Turning to FIGS. 2 and 3, the planet pinion pin 22 is cylindrical and includes a first end 40 disposed opposite a second end 42. A circumferential groove 44 is formed or otherwise machined in an outer surface 46 of the planet pinion pin 22. The groove 44 is disposed proximate the first end 40. An axial bore 48 is formed or otherwise machined along an axis 50 of the planet pinion pin 22 from the first end 40 to an approximate axial midpoint of the planet pinion pin 22. A stopper or plug 51 is disposed in the axial bore 48 at the first end 40. A feed bore 54 is formed or otherwise machined from the groove 44 on the outer surface 46 to the axial bore 48. The feed bore 54 defines an input port 54A at the outer surface 46 within the groove 44. The feed bore 54 is preferably angled to extend both axially and radially into the planet pinion pin 22. An output bore 56 is formed or otherwise machined from the outer surface 46 through the planet pinion pin 22 at the approximate midpoint 52 and extends through the axis 50. Accordingly, the output bore 56 communicates with the axial bore 48. The output bore 56 defines a first output port 56A on the outer surface 46 and a second output port 56B on the outer surface 46.

Returning to FIG. 1, the carrier plate 16 includes an inner surface 60 that defines a central opening 62 sized to receive the shaft 12 therethrough. A circumferential inner groove 64 is formed or otherwise machined in the inner surface 60 of the carrier plate 16. An intermediate bore 66 is formed or otherwise machined from the inner groove 64 on the inner surface 60 to the pinion pin hole 20. The intermediate bore 66 defines an input port 66A at the inner surface 60 within the groove 64 and an output port 66A within the pinion pin hole 20. It should be appreciated that the carrier plate 16 includes an equal number of intermediate bores 66 and pinion pin holes 20 in order to adequately supply oil to the planet pinion pin 22, as will be described below. The intermediate bore 66 is preferably angled to extend both axially and radially through the carrier plate 16.

Disposed between the inner surface 60 of the carrier plate 16 and the shaft 12 is a bushing 70. The bushing 70 allows for relative rotation between the planet carrier assembly 10 and the shaft 12. The bushing 70 includes a plurality of slots or holes 70A that extend radially through the bushing 70. The slots 70A allow for communication from a supply passage 72 formed in the shaft 12 through the bushing 70 to the inner groove 64.

The shaft 12, the bushing 70, the carrier plate 16, and the planet pinion 22 cooperate to define a lubrication circuit for supplying pressurized hydraulic fluid or oil from the shaft 12 to the bearings 26 and 28. Oil is communicated from a pressurized source, such as a pump (not shown), through the shaft 12 into the supply passage 72. Oil communicates through the slots 70A of the bushing 70 and into the inner groove 64. From the inner groove 64 the oil communicates through the intermediate bore 66 and into the groove 44 of the planet pinion pin 22. The circumferential groove 44 eliminates the need to align the output port 66B of the carrier plate 16 with the input port 54A of the planet pinion pin 22. From the groove 44 of the planet pinion pin 22 the oil communicates through the feed bore 54 into the axial bore 48, and from the axial bore to the output bore 56. The oil leaves the planet pinion pin 22 at the output ports 56A and 56B at an optimal location between the bearings 26 and 28, thereby lubricating the bearings 26 and 28.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

What is claimed is:

1. A pinion pin for a planetary gear set comprising:
   a cylindrical body having a first end, a second end opposite the first end, and an outer surface;
   a groove formed in the outer surface proximate the first end, the groove extending circumferentially around the cylindrical body;
   a first passage disposed in the cylindrical body and in communication with the groove;
   a second passage disposed in the cylindrical body and in communication with the first passage; and
   a third passage disposed in the cylindrical body and in communication with the second passage and with the outer surface.

2. The pinion pin of claim 1 wherein the second passage is disposed along an axis defined by the cylindrical body.

3. The pinion pin of claim 2 wherein the third passage extends along a diameter of the cylindrical body and through the axis.

4. The pinion pin of claim 3 wherein the third passage defines a first port on the outer surface and a second port on the outer surface opposite the first port.

5. The pinion pin of claim 4 wherein the third passage is disposed at the axial midpoint of the cylindrical body.

6. The pinion pin of claim 1 wherein the first passage defines a port in the groove of the outer surface.

7. An assembly in a transmission of a motor vehicle, the assembly comprising:
   a member having a first passage;
   a bushing disposed around the member, the bushing having a slot in communication with the first passage;
   a planet carrier having a plate with an inner groove in communication with the slot of the bushing, a pinion pin hole, and a second passage that communicates between the inner groove and the pinion pin hole, the planet carrier further having a pinion disposed within the pinion pin hole and a bearing disposed on the pinion pin for supporting a planetary gear, wherein the pinion pin includes:
      a cylindrical body having a first end, a second end opposite the first end, and an outer surface, wherein the outer surface supports the bearing;
      a groove disposed in the outer surface proximate the first end, the groove extending circumferentially around the cylindrical body and in communication with the second passage;
      a third passage extending from the groove into the cylindrical body;

a fourth passage extending from the third passage into the cylindrical body along an axis of the cylindrical body; and a fifth passage extending from the fourth passage to the outer surface.

8. The assembly of claim 7 wherein the member is a shaft.

9. The assembly of claim 7 wherein a pressurized hydraulic fluid is communicated from the first passage, through the slot of the bushing into the inner groove of the planet carrier, through the second passage into the groove of the pinion, through the third and fourth passages to the fifth passage, and from the fifth passage to the bearing supported on the outer surface of the pinion pin.

10. The assembly of claim 7 further comprising a second bearing supported on the pinion pin.

11. The assembly of claim 10 wherein the fifth passage defines an outlet on the outer surface disposed axially between the bearings.

12. The assembly of claim 7 wherein the first end of the pinion pin is disposed in the pinion pin hole of the plate.

13. The assembly of claim 12 wherein the planet carrier further includes a spider connected to the plate, the spider having a second pinion pin hole opposite the pinion hole of the plate, and wherein the second end of the pinion pin is supported within the second pinion pin hole.

14. The assembly of claim 7 wherein the fifth passage extends along a diameter of the cylindrical body and through the axis.

15. The assembly of claim 14 wherein the fifth passage defines a first port on the outer surface and a second port on the outer surface opposite the first port.

16. The assembly of claim 15 wherein the fifth passage is disposed at the axial midpoint of the cylindrical body.

17. The assembly of claim 7 wherein the third passage defines a port in the groove of the outer surface.

18. An assembly in a transmission of a motor vehicle, the assembly comprising:
   a member having a first passage;
   a bushing disposed around the member, the bushing having a slot in communication with the first passage;
   a planet carrier having a plate with an inner groove in communication with the slot of the bushing, a pinion pin hole, and a second passage that communicates between the inner groove and the pinion pin hole, the planet carrier further having a pinion disposed within the pinion pin hole and a first and a second bearing disposed on the pinion pin, wherein the pinion pin includes:
      a cylindrical body having a first end, a second end opposite the first end, and an outer surface, wherein the outer surface supports the bearing;
      a groove disposed in the outer surface proximate the first end, the groove extending circumferentially around the cylindrical body and in communication with the second passage;
      a third passage extending from the groove into the cylindrical body;
      a fourth passage extending from the third passage into the cylindrical body along an axis of the cylindrical body; and
      a fifth passage extending from the fourth passage to the outer surface between the first and second bearings, and
   wherein a pressurized hydraulic fluid is communicated from the first passage, through the slot of the bushing into the inner groove of the planet carrier, through the second passage into the groove of the pinion pin, through the third and fourth passages to the fifth passage, and from the fifth passage to the first and second bearings to provide lubrication to the first and second bearings.

19. The assembly of claim 18 wherein the planet carrier further includes a planetary gear supported for rotation on the first and second bearings.

20. The assembly of claim 19 wherein the planet carrier further includes a spider connected to the plate, the spider having a pinion pin hole opposite the pinion pin hole of the plate, and wherein the first end of the pinion pin is disposed in the pinion pin hole of the plate and the second end of the pinion pin is supported within the second pinion pin hole of the spider.

* * * * *